United States Patent [19]

Wickham et al.

[11] Patent Number: 4,651,852

[45] Date of Patent: Mar. 24, 1987

[54] ELECTRICALLY-CONTROLLED ACTUATORS

[75] Inventors: David J. Wickham; Jack Washbourn, both of Chippenham; Howard F. Cogan, Leire, all of England

[73] Assignee: Westinghouse Brake and Signal Co. Ltd., Wiltshire, England

[21] Appl. No.: 607,662

[22] Filed: May 7, 1984

[30] Foreign Application Priority Data

Jun. 17, 1983 [GB] United Kingdom ................. 8316544
Jun. 17, 1983 [GB] United Kingdom ................. 8316545
Oct. 4, 1983 [GB] United Kingdom ................. 8326467

[51] Int. Cl.⁴ ..................... B60K 41/20; B60T 13/04; B60T 13/74
[52] U.S. Cl. ........................................ 192/2; 188/173; 192/90; 192/111 A
[58] Field of Search ............. 192/2, 90, 111 A, 89 A; 267/174, 175; 188/2 A, 58, 124, 196 V, 202, 171, 173, 134

[56] References Cited

U.S. PATENT DOCUMENTS

| 909,894 | 1/1909 | Hanson | 192/89 A |
| 1,272,038 | 7/1918 | Halsey | 188/173 |
| 1,348,106 | 7/1920 | Halsey | 188/173 |
| 3,762,522 | 10/1973 | Kirschling | 192/111 A |
| 4,033,435 | 7/1977 | Bayliss | 188/173 |
| 4,175,645 | 11/1979 | Brinkert | 188/173 X |

FOREIGN PATENT DOCUMENTS 909176 10/1962 United Kingdom .

Primary Examiner—Rodney H. Bonck
Attorney, Agent, or Firm—Larson and Taylor

[57] ABSTRACT

An electrically-controlled force-exerting actuator comprising a force-applying power spring arranged to exert a force on an output member, a force-applying control spring arranged with respect to the power spring such that the force exerted by the control spring is detracted from the force exerted by the power spring to determine the residual force exerted on the output member by the power spring, and an electric motor operable to vary the detractive force exerted by the control spring.

15 Claims, 5 Drawing Figures

ELECTRICALLY-CONTROLLED ACTUATORS

This invention relates to electrically-controlled force-exerting actuators.

Such actuators are known for use, for example, in railway braking equipment where the actuators generate the braking forces required. Previously-proposed actuators have used an electric motor which itself generates directly the required braking forces or, alternatively, the braking forces have been generated by a power spring the force exerted by which is directly controlled by an electric motor of the actuator. In both these previously-proposed constructions, problems arise from the considerable hysteresis inherent in such direct systems. Attempts have been made to mitigate this problem by designing the actuator and its control system to operate on different parts of the hysteresis loop dependent upon the direction of operation of the actuator, that is to say, dependent upon whether the required braking force is being increased or decreased. However, such a solution presumes a particular hysteresis loop which may or may not be valid for any particular actuator and its operating context.

The present invention minimises the hysteresis problem by using a control spring controlled by the electric motor and acting in opposition to the power spring.

Accordingly the present invention provides an electrically-controlled force-exerting actuator comprising a force-applying power spring arranged to exert a force on an output member, a force-applying control spring arranged with respect to the power spring such that the force exerted by the control spring is detracted from the force exerted by the power spring to determine the residual force exerted on the output member by the power spring, and an electric motor operable to vary the detractive force exerted by the control spring.

The power spring may be operative between the output member and a fixed part of a housing of the actuator, the control spring then being operative between the output member and a part the position of which is determined by operation of the electric motor. In such an arrangement, said part may be threadedly engaged with a threaded member, the operation of the electric motor effecting relative rotation of the part and the threaded member. Alternatively, said part may be a cam rotation of which by the electric motor determines the detractive force exerted by the control spring.

There may be provided an adjustable stop variation of the position of which variably determines the minimum force exertable by the control spring. In this case, the adjustable stop may be threadedly engaged with a threaded part when such is provided, there then being provided a second electric motor operation of which effects relative rotation of the stop and the threaded part thereby adjustably to position the adjustable stop. The adjustable stop may be carried on the output member and may be collapsible. The stop may be engageable by a part mounted for rotation with but for axial movement relative to the threaded member when such a threaded member is provided. In this case, the threaded member may be normally restrained from rotation by a normally-energised electrically-controlled locking means effective to lock the threaded member until the locking means is de-energised. When the part the position of which is determined by operation of the electric motor is a cam as above described, the part engageable with the stop may be mounted for rotation with the cam but for axial movement relative to the cam.

There may further be provided a final output member in addition to the output member and to which any residual force exerted on the output member can be transmitted, there then also being provided means for extending the final output member relative to the output member before any residual output force exerted on the output member is transmitted to the final output member. In this case, the transmission path for the residual output force between the output member and the final output member may include two relatively-rotatable and threadedly-engaged members of which one is clutchable to the output member and the other is engageable with the final output member. There may be provided a spring which urges the output member and the final output member to their relatively extended positions, the spring being operative on said other of the two relatively-rotatable and threadedly-engaged members. Sensing means may then be provided for sensing when the output member and the final output member are in their relatively extended positions and which, only when so sensed, allows operation of the electric motor which is operable to vary the detractive force. A further electric motor may be provided by operation of which the two relatively-rotatable threadedly-engaged members can be relatively rotated relatively to move the output member and the final output member against the effect of the spring urging these two output members to their relatively extended positions, to their relatively un-extended position. The sensing means may then allow operation of the further electric motor only after completion of operation of the electric motor which is operable to vary the detractive force fully to cease exertion of the residual force on the output member.

There may be provided a final output member in addition to the output member and to which any residual output force exerted on the output member can be transmitted, means then being provided for extending the final output member relative to the output member before any residual output force exerted on the output member is transmitted to the final output member. The transmission path for the residual output force between the output member and the final output member may include two relatively-rotatable and threadedly-engaged members of which one is clutchable to the output member and the other is engageable with the final output member. There may also be provided a spring which urges the output member and the final output member to their relatively extended positions, the spring being operative on said other of the two relatively-rotatable and threadedly-engaged members. Sensing means may be provided for sensing when the output member and the final output member are in their relatively extended positions and which, only when so sensed, allows operation of the electric motor. There may be a further electric motor by operation of which the two relatively-rotatable threadedly-engaged members can be relatively rotated to move the output member and the final output member against the effect of the spring urging these two output members to their relatively extended positions, to their relatively un-extended position. The sensing means may also allow operation of this further electric motor only after completion of operation of the first-mentioned electric motor fully to cease exertion of the residual force on the output member.

Embodiments of the present invention will now be described in greater detail, by way of example only, with reference to the accompanying drawings, of which:

The following embodiments of the invention will all be described in the context of railway brake actuators. It will, however, be understood that the concepts incorporated in the following described embodiment can equally well be used in brake actuators for other forms of vehicles. Indeed, they are applicable also to brake actuators for other forms of rotating machinery or, generally, to actuators for generating a force for other than braking usage.

Figure 1:
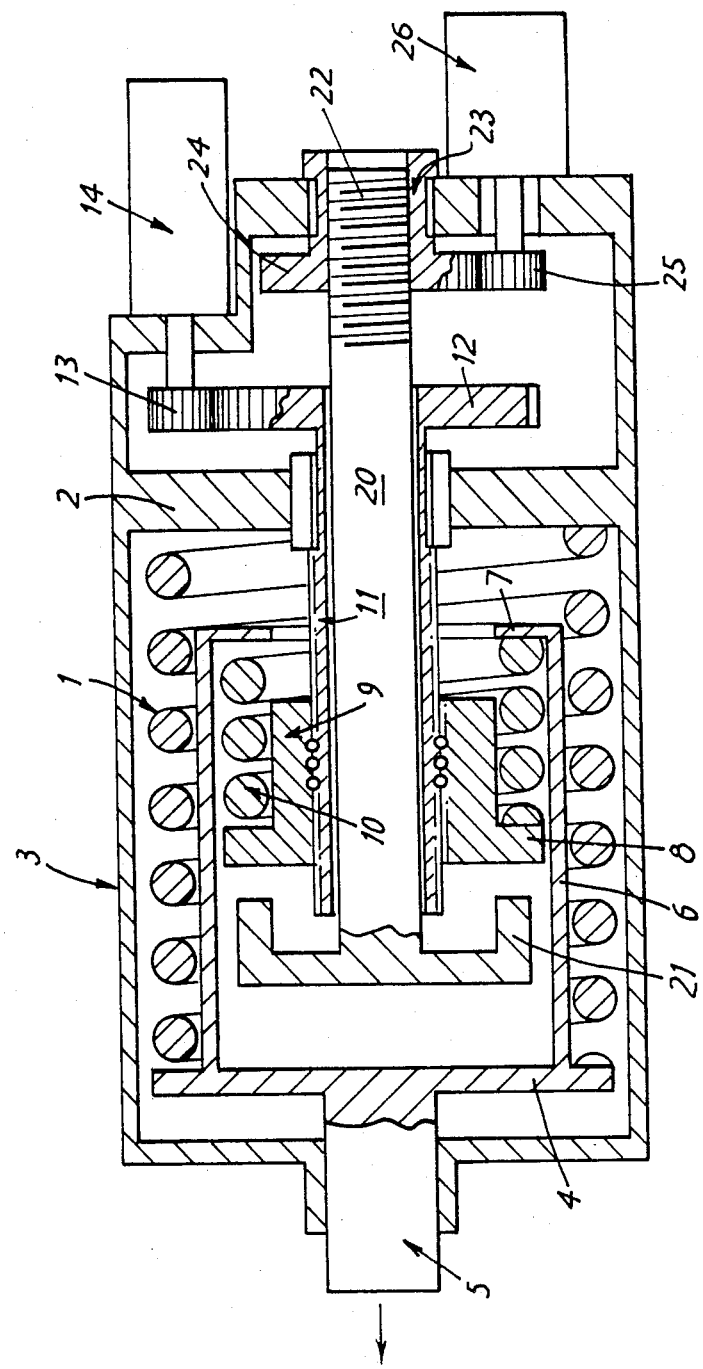
FIG. 1 is a longitudinal cross-sectional view of a first embodiment.

Referring to FIG. 1, the force-exerting actuator has a power spring 1 which extends between an intermediate wall 2 of a housing 3 of the actuator and a flange 4 carried on the end of an output member 5. Extending axially from the flange 4 is a cylindrical extension 6 which lies co-axially with the power spring 1 and, at its end remote from flange 4, has a radially inwardly projecting second flange 7.

Trapped between the second flange 7 and a radially outwardly projecting flange 8 on a nut 9, is a control spring 10. The nut 9 is threadedly engaged with a ball-screw 11 which is in the form of a sleeve which passes through the wall 2 of the housing 3. Secured to the end of the ball-screw sleeve 11 on the opposite side of the wall 2 from the nut 10, is a gear 12 meshed with a pinion 13 arranged to be driven by an electric stepping motor 14.

As so far described, the actuator operates as follows:

The actuator is shown in FIG. 1 in its "release" position. In this position, the control spring 10 is sufficiently compressed that it exerts on the flange 7 a sufficient force totally to balance the force exerted by the power spring 1. Thus, the power spring 1 is prevented from exerting any force on the output member 5. From this position, the stepping motor 14 can be operated to rotate pinion 13 and, therefore, through gear 12, the ball-screw sleeve 11 in such a direction as to wind the nut 9 towards the left (as viewed in FIG. 1). Such movement of the nut 9 will allow the control spring 10 to expand and thus reduce the force which it exerts on the power spring 1. By such reduction, the detraction which the control spring 10 makes from the force exerted by the power spring 1 is reduced and the power spring 1 thus is freed to exert on the output member 5 a force which is the difference between the total force of which the power spring 1 is capable of exerting and the reduced force which the control spring 10 exerts in opposition to the power spring 1. It will thus be seen that, by controlling the operation of the stepping motor 14, the nut 9 can be positioned to control the force exerted by the control spring 10 and, therefore, the residual force allowed to be exerted by the power spring 1 on the output member 5.

In the context of railway braking equipment, the electric motor 14 would be controlled to determine the degree of braking required to be effected and this determined degree would be effected by the output member 5 being arranged to be operative on the braking members of the brake equipment.

One characteristic sometimes required, in railway braking equipment, is that the maximum braking force allowed to be exerted shall be dependent on the loading of the railway vehicle. The facility to provide for this requirement is provided in the actuator of FIG. 1 by the following parts:

Passing through the ball-screw sleeve 11 is a shaft 20 which, at its left-hand end as seen in FIG. 1, has a cup-shaped flange 21, and, adjacent its right-hand end, has a threaded portion 22. Engaged with the portion 22 is a second nut 23 integral with a gear wheel 24 meshed with a pinion 25, and arranged to be driven by a second electric stepping motor 26. The motor 26 is arranged in a suitable electric circuit to be operated to an extent dependent upon the load of the vehicle on which the actuator is used. Variable operation of the motor 26 in dependence upon the load will, through pinion 25, gear wheel 24 and second nut 23 variably axially position the flange 21. The flange 21 being located in the axial path of the nut 9, the flange 21 will act as an adjustable stop variably to limit the maximum movement of the nut 9 and, therefore, the minimum value which the control spring 10 is allowed to detract from the force exerted by the power spring 1. Thus, the maximum residual force allowed to be exerted by the power spring 1 on the output member 5 (and, therefore, the maximum braking force which can be exerted) is controlled in dependence upon the loading of the vehicle.

At least in certain railway braking contexts, the above described simple actuator suffers a major disadvantage. Because there is no provision for taking up the slack before the springs become operative to exert an output force on the output member, the springs would have to be such as to allow of their extension to take up such slack. The next described actuator has such a provision and allows for the slack to be taken up before the springs are allowed to be operative to exert the output force.

Figure 2:
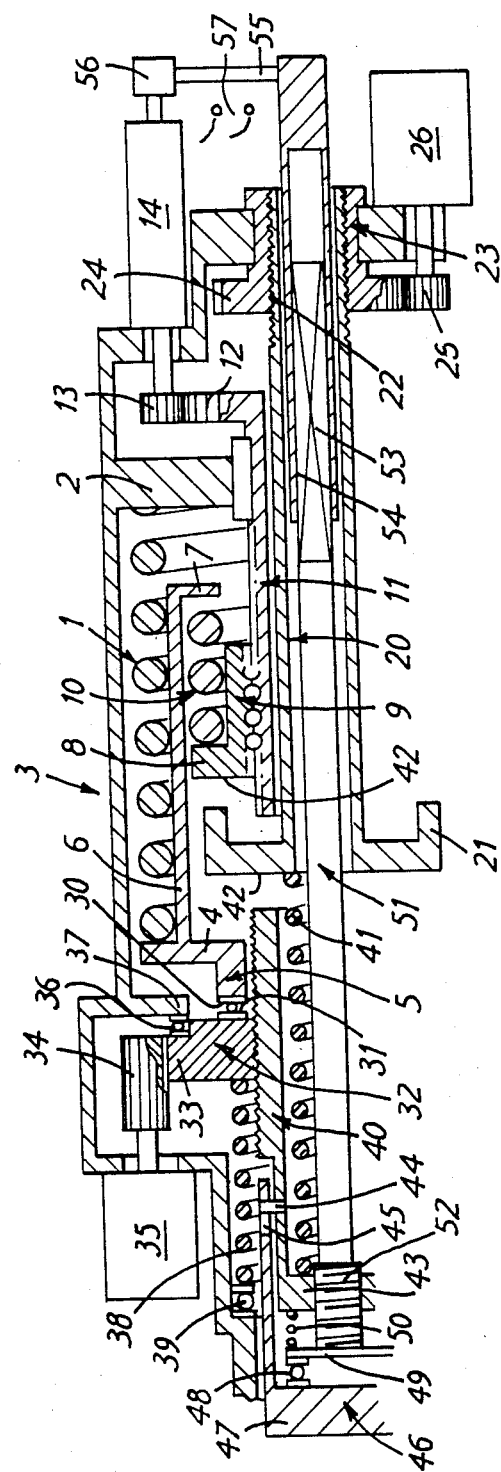
FIG. 2 is a longitudinal generally-half sectional view of a second embodiment.

Referring to FIG. 2, the right-hand half of the actuator is, in all essentials, substantially identical to the actuator of FIG. 1 and like reference numerals are used for like parts. These parts of the actuator operate in exactly the same manner as the like parts of the actuator of FIG. 1 and, therefore, here require no further description. The only point of difference between the two actutors in these parts is that the shaft 20 in the FIG. 2 embodiment is tubular for a reason which will become more apparent hereinafter.

The left-hand end face of the output member 5 is formed with a clutch face 30 engageable with a complementary clutch face 31 on a nut 32. The periphery of the nut 32 is formed as a gearwheel 33 meshed with a pinion 34 arranged to be driven by a third electric motor 35. Carried by the nut 32 in the region of the gearwheel 33 is a bearing 36 by which the nut 32 can rotationally engage a radially inwardly projecting wall 37 of the housing 3.

The nut 32 is urged to the right by a spring 38 effective between the nut 32 and a thrust bearing 39 carried by the housing 3.

The nut 32 is threadedly-engaged with a reversible thread with a tubular member 40 which co-axially houses a spring 41 effective between the left-hand end face 42 of the cup-shaped flange 21 on the shaft 20 and a radially inwardly-projecting flange 43 of the tubular member 40. The tubular member 40 carries a pin 44 which projects into an axially extending slot 45 in a tubular final output member 46.

The left-hand end of the final output member 46 is closed by an end face 47 which carries a further thrust race 48 resiliently engaged with a flange 49 which is trapped between the thrust race 48 and a spring 50 extending between the flange 49 and the flange 43 of the member 40. The flange 49 is formed on the end of a shaft 51 which passes through the actuator and, particularly, through the tubular shaft 20. Towards its left-hand end, the shaft 51 has a threaded portion 52 which is threadedly engaged with the internal periphery of the flange 43 of the tubular member 40. Adjacent its right-hand end the shaft 51 has a squared portion 53 slidably engaged by a complementary-shaped squared tube 54. At its right-hand extremity, the tube 54 carries an operating arm 55 arranged to control operation of a mechanical clutch 56 of the stepping electric motor 14. Positioned so as to be engaged by the operating arm 55 are a pair of electrical contacts 57.

The actuator of FIG. 2 operates in the following manner:

The actuator, which is a railway brake actuator, is shown in FIG. 2 in the "brake-released" condition. In this condition, the clutch 56 is "made" to prevent rotation of the stepping motor 14 and the control spring 10 is thus held compressed equally to hold compressed the power spring 1. There is, therefore, no output force exerted by these combined springs on the output member 5 as is explained above in relation to the FIG. 1 embodiment. Also, the integral clutch in the electric motor 35 is energised thereby holding the nut 32, the tubular member 40, the final output member 46 and the shaft 51 all in their positions as shown in FIG. 2.

To apply the brakes, the integral clutch in the electric motor 35 is de-energised and thereby released. Such release of this clutch allows the spring 41 to extend taking with it the tubular member 40 (spinning the nut 32 on its bearing 36 through the threaded engagement of the member 40 with the nut 32), the final output member 46 (through the spring 50, flange 49 and thrust bearing 48) and the shaft 51 (by its flange 49 being trapped between the spring 50 and the thrust bearing 48). Such movement of all of these parts will continue until the brakes are engaged. When such engagement occurs, the final output member 46 will be unable to travel any further. As the member 46 cannot now move any further, the spring 41, being the stronger, will compress the spring 50. To effect this, the shaft 51 will be rotated on the thrust bearing 49 by virtue of the threaded engagement of the flange 43 with the threaded portion 52 of the shaft 51. In such compression of the spring 50, the tubular member 40 can move axially of the final output member 46 by virtue of the pin-and-slot 44/45 connection between these two members.

Rotation thus caused of the shaft 51 causes the squared tube 54 similarly to be rotated. This rotation of the squared tube 54 causes, firstly, the clutch 56 to be freed thus to free the motor 14 for operation and, secondly, by making the contacts 57, energises the motor 14. In the manner above described with reference to FIG. 1, the motor 14 can now be operated to reduce the force exerted by the control spring 10, thus reducing the detraction which this spring 10 makes from the force exerted by the spring 1. Thus, the differential force is exerted on the output member 5 which is first moved to engage the clutch 30/31 and, thereafter, the force exerted on the output member 5 is transmitted through the nut 32, the tubular member 40, its flange 43, the threaded portion 52 of the shaft 51, the flange 49 of the shaft 51, and the thrust bearing 49, to the end face 47 of the final output member 46. Thus, a braking force determined by the degree of operation of the stepping motor 14 is impressed on the final output member 46 and the previously-engaged brakes.

Subsequently to release the brakes, the stepping motor 14 is first operated to re-compress the control spring 10. Such re-compression will, as above described with reference to FIG. 1, remove the braking force exerted on the output member 5 and will disengage the clutch 30/31. In this process, the nut 32 will be restored to its position in which its thrust bearing 36 re-engages the wall 37 of the housing 3 carrying back with it the tubular member 40 and the final output member 46 as the previous stretch in the brake rigging recovers under relaxation of the previously-applied braking forces. When all the braking force has finally been relieved by the above actions, the spring 41 is freed to re-expand. This re-expansion of spring 41 rotates the shaft 51 in the direction opposite to which it had been rotated during the brake application causing, through the squared tube 54 and the operating arm 55, the contacts 57 to be broken and the clutch 56 to be re-made. Hence, further operation of the motor 14 is prevented and the parts of the actuator controlled by the electric motor 14 are locked in their "brakes released" condition. The breaking of the contacts 57 also causes a pre-determined degree of operation of the electric motor 35. Such operation rotates the nut 32 and, thereby, moves the tubular member 40 a predetermined axial distance to the right. Through the pin-and-slot connection 44/45, such movement of the member 40 carries with it the final output member 46 to give a pre-determined brake clearance. The axial movement of the members 40 and 46 in this setting of the brake clearance, re-compresses the spring 41.

The parts of the actuator have now all been returned to a "brakes released" condition with a pre-determined amount of brake clearance. Hence, it will be seen that the right-hand parts of the actuator are also, effectively, a slack adjuster for, irrespective of whatever may have been the degree of wear of the brakes in successive brake applications, the brake clearance is always adjusted during a brake-release operation to a pre-determined value.

Should there be an electric-power failure, a brake application is automatically effected. De-energisation of the integral clutch of the motor 35 will allow the spring 41 to apply the brakes. Thereafter, the clutch 56 will be "broken" upon collapse of the spring 50 and the clutch 30/31 "made" (both in the manner above described) so that the spring arrangement 1/10 is clutched to the final output member 46 to allow the exertion of braking forces.

It will be noted that the motor 26, pinion 25, gearwheel 24, tubular shaft 20 and flange 21 provide the facility for load limitation of the maximum braking forces allowed in exactly the same way as is described with reference to FIG. 1.

Figure 3:
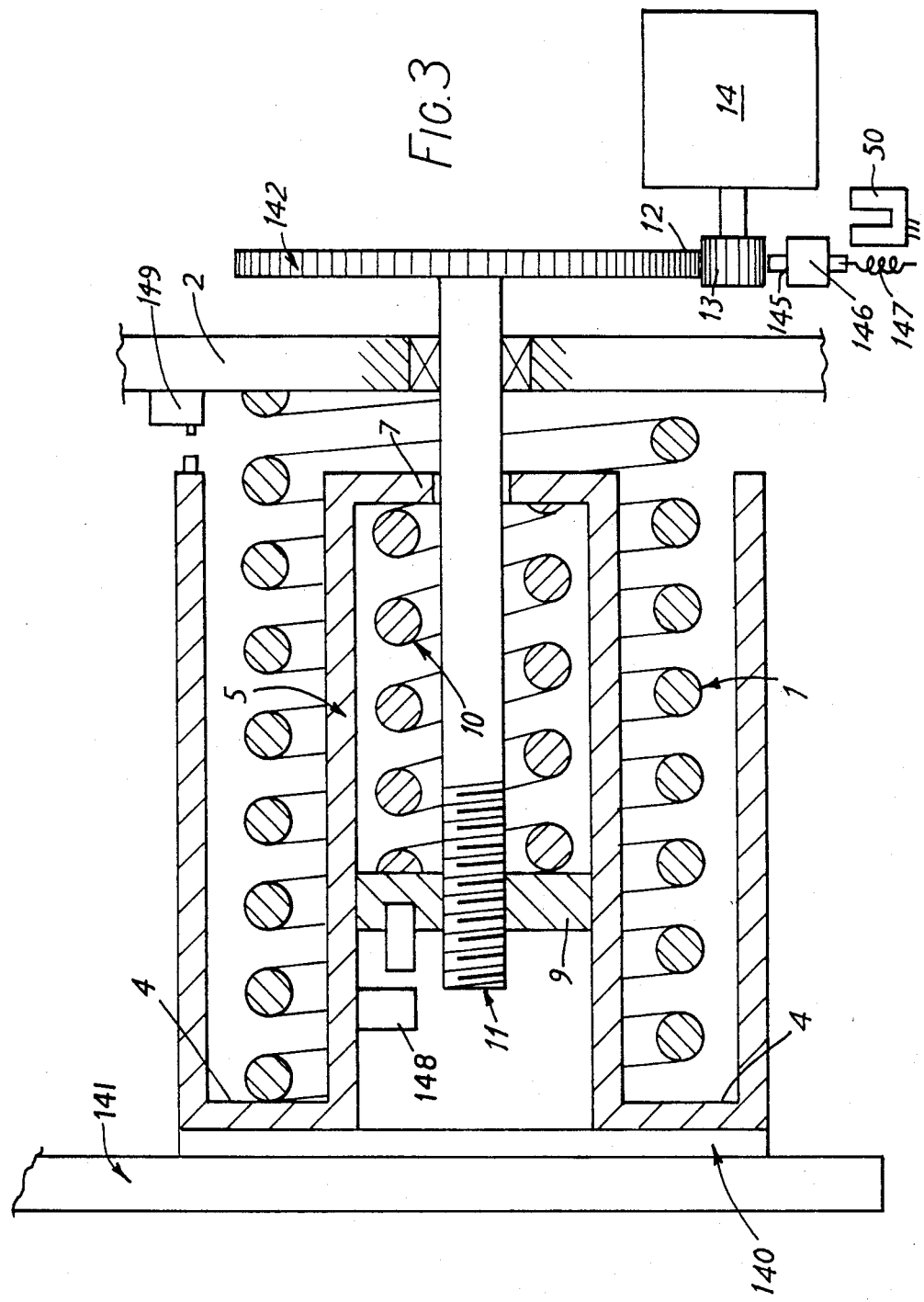
FIG. 3 is a diagrammatic cross-sectional view of a third embodiment suitable for use with disc brakes.

Referring now to FIG. 3, there is here illustrated an actuator suitable for operation of railway disc-brake equipment. Some of the parts are the equivalency of the parts shown in the embodiment of FIG. 1 and for such parts, the same reference numerals are used in the two embodiments.

The actuator of FIG. 3 includes the power spring 1 and the control spring 10. The power spring 1 is operative between the intermediate wall 2 of the housing (not shown in totality in FIG. 3) and the flange 4 of the output member 5. The control spring 10 is operative between the second flange 7 on the output member 5 and a nut 9 threadedly engaged with a reversible screw thread on a ball-screw shaft 11.

Carried by the flange 4 of the output member 5 is a brake pad 140 engageable with a brake disc 141.

At its end opposite from the nut 9, the ball-screw shaft 11 carries a slotted disc 142 the periphery of which provides the gearwheel 12 meshed with the pinion 13 arranged to be driven by the electric motor 14.

As thus far described, the actuator of FIG. 3 operates in the same manner as that of FIG. 1 in that, in the "brake released" condition shown in FIG. 3, the control spring 10 is held fully compressed and overcomes the force exerted by the power spring 1 thus holding the brake pad 140 out of engagement with the brake disc 141. Operation of the electric motor 14 will "let out" the control spring 10 and, thereby, reduce the force which it exerts in opposition to the power spring 1. By variably operating the electric motor 14 to vary the detractive force exerted by the control spring 10, the residual force exerted by the power spring 1 on the output member 5 can be varied to produce the required braking force exerted by the brake pad 141 on the brake disc 141.

To lock the electric motor 14 in any desired position of its operation, is a pawl 145 operable under the control of a solenoid 146 to engage between the teeth of the pinion 13. The pawl 145 is loaded by a spring 147 normally to be out of engagement with the pinion 13, energisation of the solenoid 146 driving the pawl 45 into between the teeth of the pinion 13 against that spring loading.

Located adjacent the slotted disc 142 is a slotted Hall-effect switch 150 which measures the degree of rotation of the disc 142.

Carried by the output member 5 is a first microswitch 148 which lies in the path of the nut 9. A second microswitch 149 carried by the intermediate wall 2 lies in the path of the output member 5 in its direction of travel to release the brakes.

This FIG. 3 embodiment operates in the following manner:

The actuator is shown in FIG. 3 in its "brakes released" condition and in this condition the solenoid 146 will have been energised to engage the pawl 145 with the pinion 13 and thus hold the motor 14 and slotted disc 142 in a position in which the control spring 10 is held compressed sufficiently fully to overcome the power spring 1. Thus the output member 5 will have been retracted and the brake pad 140 held out of engagement from the brake disc 141.

From this "brakes released" condition, an electrical control signal is first generated to indicate the required degree of braking. The generation of this control signal will first de-energise the solenoid 146 so that the spring 147 will withdraw the pawl 145 from engagement with the pinion 13. The release of pinion 13 then frees, through the gearwheel 12, the slotted disc 142 and the shaft 11 for rotation. Freeing the shaft 11 for such rotation, allows the control spring 10 to expand driving the nut 9 to the left. At the same time, expansion of the control spring 10 reduces the force which it exerts in opposition to the power spring 1 thus allowing the spring 1 to expand driving the output member 5 to the left to bring the brake pad 140 into engagement with the brake disc 141.

When the brake pad 140 is engaged with the brake disc 141, the output member 5 is prevented from any further leftward movement and the power spring 1 from any further extension. However, the control spring 10 is not so inhibited and it will continue to expand. Shortly after the brake pad 140 engages the brake disc 141, the continuing expansion of the control spring 10 will carry the nut 9 to engage the microswitch 148. Operation of the microswitch 148 generates a signal to cause the slotted Hall-effect switch 150 to start measuring the rotation of the disc 142. Clearly, the rotation of the disc 142 is a measure of the axial movement of the nut 9 which is, itself, a measure of the expansion of the control spring 10. In so far as the expansion of the control spring 10 is indicative of the reduction of the force which it exerts in opposition to the power spring 1 and, therefore, an indication of the residual force exerted on the output member 5 by the power spring 1 and, consequently, the braking force being exerted by the brake pad 140 on the brake disc 141, the rotation of the disc 142 is an indirect measurement of the braking force being exerted. The output signal from the slotted Hall-effect switch 150 is therefore compared with the original electrical signal generated to indicate the required degree of braking. When this output signal indicates a degree of braking just short of that indicated as required by the original electrical circuit, the solenoid 146 is energized to prevent any further extension of the control spring 1. The control spring 1 will thus be brought to a halt at a point which will result in the required degree of braking. Should the solenoid 146 have been energised too early or too late so that the nut 14 "undershoots" or "overshoots", this will be seen by the switch 150 and the solenoid 146 and the motor 14 operated accordingly. When the switch 150 "reads" the rotation of the disc 142 as indicative of the braking force being that required, the solenoid 146 is energised to engage the pawl 145 with the pinion 13 and thus "lock-in" that required degree of braking.

Should a variation in the required degree of braking now be indicated by variation of the original electrical signal, the pawl 145 will again be released and the electric motor 14 energised, if appropriate, to vary the degree of braking to bring it into accord with the variation to the electrical signal.

To release the brakes, the electrical signal is suitably revised. Such revision will, again, first cause the pawl 145 to be released from engagement with the pinion 13 and, thereafter, the motor 14 energised. Energisation of the motor 14 will now, through the pinion 13 and the gearwheel 12, rotate the shaft 11 to "wind-back" the nut 9 and re-compress the control spring 10. Initial re-compression of the spring 10 will increase the force detracted by it from that exerted by the power spring 1, thus reducing the braking force being exerted between the brake pad 140 and the brake disc 141. When this braking force has been substantially wholly reduced, continued compression of the control spring 10 will pull the brake pad 140 away from the brake disc 141. Just prior to the brake pad 140 leaving the brake disc 141, the nut 9 will also leave the microswitch 148. Thereafter, the motor 14 is continued to be operated for a predetermined amount (again, measured by the slotted Hall-effect switch 150) to provide the required clearance between the brake pad 140 and the brake disc 141.

It will be observed, of course, that any electrical power failure will result in a full brake application as loss of power will result in the pawl 145 being retracted from the pinion 13 by the spring 147 with the motor 14 remaining de-energised. Hence, the control spring 11 can fully expand to allow the totality of the force exertable by the power spring 1 to be applied as a braking force to the output member 5.

It will have been noted that, so far in the description of the operation, no mention has been made of microswitch 149. Spring-applied brake actuators conventionally have a manual release facility. It will be seen that the microswitch 149 is positioned beyond the normal "brake release" condition of the actuator. After a manual release, the control spring 10 will need to be compressed beyond its normal fully compressed condition so that the power spring 1 is, equally, more than fully compressed. The function of the microswitch 149 is to detect when the two springs 1 and 10 have been sufficiently over-compressed as to permit re-setting of the manual release.

Figure 4:
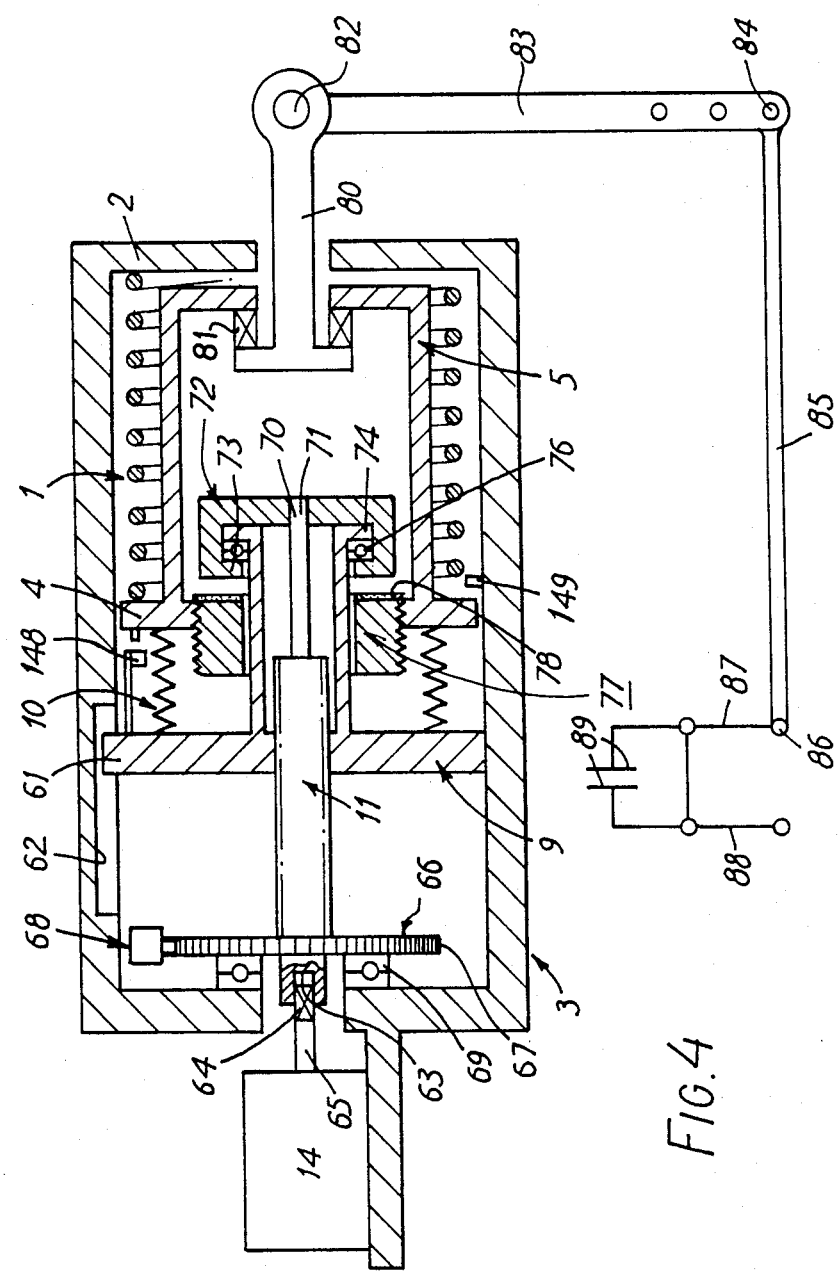
FIG. 4 is a diagrammatic representation of a fourth embodiment which is illustrated connected to disc brake equipment.

Referring to FIG. 4, there is here illustrated another form of actuator incorporated into railway disc brake equipment. Again, like reference numerals are used for like parts in the preceding embodiments.

The actuator again includes the power spring 1 and the control spring 10. The power spring 1 is operative between (in this case) the end wall 2 and the flange 4 of the output member 5. The control spring 10 is operative between (in this case) the flange 4 and the nut 9 which, in this embodiment, is extended into a disc-like form being slidable within the housing 3 but being held from rotation relative thereto by a key 61 which rides in a slot 62 in the interior wall of the housing 3. The nut 9 is threadedly engaged on the ball-screw shaft 11.

At its end remote from the nut 9, the shaft 11 has a socket 63 of square cross-section which receives the squared-end 64 of the output shaft 65 of the electric motor 14.

As so far described, the actuator of this embodiment operates exactly as those of the preceding embodiments in that:

in the "brake released" condition of the actuator as shown in FIG. 4, the control spring 10 is fully compressed so as to overcome the force exerted by the power spring 1 and thus ensuring that there is no residual output force applied to the output member 5, and to apply the brakes, the motor 14 is freed to rotate the de-energisation of the latch 68. This permits the control spring 10 to expand thus reducing the detractive force exerted by it and, consequently, allowing an increasing residual force to be exerted by the power spring 1 on the output member 5.

In this embodiment, the shaft 11 has integral with it a disc 66 which has a toothed-periphery 67 engageable by a solenoid-operated latch 68. This latch 68, in its de-energised state, frees the shaft 11 for rotation and, in its energised state, locks the shaft 11 against rotation. The latch 68 is, of course, de-energised when the motor 14 is operated to rotate the shaft 11.

It will be seen that the disc 66 is supported for rotation on thrust bearing 69.

At its end remote from the disc 66, the shaft 11 is provided with a splined extension 70 which engages a similarly-splined axial bore 71 in a member 72. The member 72 provides a re-entrant flange 73 between which and a flange 74 at the end of a tubular extension 75 of the nut 9 is a further thrust bearing 76. Thus, on the one hand, the member 72 can rotate with the shaft 11 and, on the other hand, it can move axially with the nut 9.

Positioned in the path of axial movement of the flange 73 of the member 72, is a collaspsible or axially adjustable stop 77 the end face 78 of which facing the flange 73 constitutes a clutch face.

The above-described construction provides for limiting the maximum output force which can be exerted by the actuator, particularly, although not only, in an "emergency application" of the brakes.

From the "brakes released" condition of the actuator as shown in FIG. 4 in which the motor 14 will be de-energised and the latch 68 energised to lock the shaft 11, "emergency application" is effected merely by de-energising the latch 68. Without the motor 14 energised, de-energisation of the latch 68 frees the shaft 11 to be rotated. As it was the locking of shaft 11 which previously held the control spring 10 fully compressed, releasing shaft 11 allows the control spring 10 to extend. Such extension of the control spring 10, as in a "service" brake application, allows the residual output force to be applied to the output member 5.

Extension of the control spring 10 will also drive the nut 9 to the left, the shaft 11 (now being freed to rotate by release of the latch 68) being thereby forced to rotate. Rotation of the shaft 11, similarly rotates member 72 through the splined connection of the shaft 11 with the member 72. However, movement of the nut 9 to the left will move the member 72 axially to the left in addition to its rotation imparted by the shaft 11, by the interconnection of the nut 9 with the member 72 through the tubular extension 75, the flange 74, the thrust bearing 76 and the flange 73 on the member 72. The flange 73 will thus be carried into engagement with the collapsible stop 77 the clutch face 78 of which, being engaged by the flange 73, will prevent further rotation of the member 72 and thus the shaft 11. Such prevention of any further rotation of the shaft 11, prevents further axial movement of the nut 9 and, therefore, any further extension of the control spring 10. Thus, by the positioning of the stop 77, the minimum force can be set which the control spring 10 is allowed to detract from the power spring 1. Hence, the maximum residual output force allowed to be exerted on the output member 5 is determined by the positioning of the stop 77.

It will be noticed that the driving of the shaft 11 by the nut 9 in this way, will exert an axial loading to the left on the shaft 11. Hence, the inclusion of the thrust race 69.

It will also be noticed that apart from effecting an "emergency application" by positive de-energisation of the solenoid latch 68, such an application will automatically be effected should there by an electrical power failure.

As shown in FIG. 4, the above described actuator is suitable for operation of a railway vehicle's disc brakes.

The output member 5 is arranged to operate a final output member 80. Between these two members may be inserted some form of manual-release means 81 by which the final output member 80 can be released independently of the actuator.

The final output member 80 is pivotally connected at 82 to a lever 83 itself pivotally connected at 84 to a tension bar 85. The tension bar 85 is, in turn, pivotally connected at 86 to one of a pair of calliper levers 87/88. The levers 87/88 carry the brake pads 89.

Clearly, any movement of and force exerted by the output member 5 is transmitted to the brake pads 89. Micro-switches 48 and 49 are again, provided, they having the same functions as the similarly-referenced micro-switches in the embodiment of FIG. 3.

The above described embodiment has a particular advantage over the previously-described embodiments. If a load-limited brake application is being made, whether as an "emergency application" or otherwise, this will be a particularly heavy brake application with likely consequential greater wear of the brake pad or block. Whilst a slack adjuster may be incorporated, this will not deal with the brake wear as it occurs during a particular brake application but will merely adjust for such wear which occurs during one application before the next is made. In the previous embodiments it will be seen that the element which sets the maximum limit of a brake application (the cup-shaped flange 21 in FIGS. 1 and 2) constitutes a fixed "land" once it has been positioned. With these embodiments, because of this arrangement, should there be any appreciable wear of the brake members during a load-limited brake application, the value of the brake application will rapidly fall-off with such wear. This will be so for the following reason: as the brake wears, the output member 5 will further extend under the influence of the power spring 1 to accommodate such wear. Not only will, therefore, the residual force applied through the output member 5 drop with the consequential extension of the power spring 1 but, much more significantly, because the flange 8 of the nut 9 not be "grounded" on the flange 21, the power spring 1 in extending will have to compress the control spring 10. Now, the control spring 10 is far higher rated than the power spring 1 (typically, in the ratio of 20:1) so in compressing the control spring 10, its detractive force will substantially be re-increased with consequential substantial reduction of the residual force applied to the output member 5.

In contrast to this situation, it will be seen that, in the FIG. 4 embodiment, the collapsible stop 77 is carried by the flange 4 of the output member 5 and, therefore, the stop 77 moves with the output member 5. With this arrangement, assuming a load-limited brake application and wear of the brake during the application, as the brake wears, the power spring 1 will, again, extend to accommodate that wear. However, with this arrangement of FIG. 4, such extension of the power spring 1 will dis-engage the clutch face 78 from the member 72. Such dis-engagement will free the member 72 (and, therefore, the ball-screw shaft 11) for rotation. Such rotation will occur as the nut 9 is now freed for axial movement under the influence of the control spring 10. Thus, whilst the initial extension of the power spring 1 in accommodating the wear had tended to compress the control spring 10, such compression will not, in fact, occur because the control spring 10 is free to compensate for such tendency by further axially displacing the nut 9. Hence, the two springs 1 and 10 will remain balanced to generate a residual force exerted on the output member 5 which is determined by the load setting of the collapsible stop 77 irrespective of the position of the output member 5 as it moves with increasing wear of the brake.

Referring now to FIG. 5, wherein, again, like reference numerals are used for like parts in the previously-described embodiments, the actuator has power spring 1 (in the form of a pair of co-axial springs 1A and 1B) and the control spring 10. In this embodiment, the control spring is in the form of a series of springs circumferentially arranged around the tubular output member 5.

The power spring 1 extends between the intermediate wall 2 of the housing 3 of the actuator and a flange 4 carried by the output member 5. The control spring 10 extends between a second flange 7 on the output member 5 and a pressure plate 100. On the reverse side of the pressure plate 100 from the control springs 10 is a thrust race 101 co-axial with the output member 5. The thrust race 101 lies between the pressure plate 100 and a gear wheel 102 formed on its face opposite to that against which bears the thrust race 101, with a cam face 103. Under the effect of the control springs 10, the cam face 103 resiliently bears against a roller 104. The gearwheel 102 is arranged to be driven through spur gears (generally indicated by numeral 105) by the electric motor 14.

As so far described, it will be seen that the residual output force generated on the output member 5 is determined in the same manner as in the previously-described embodiments. The spur gears 105, the cam face 103 reacting on the roller 104, the gearwheel 102 and the pressure plate 100 collectively operate to permit the electric motor 14 variably to compress the control spring 10 in a fully comparable way to that, in the previous embodiments. Again as with the previous embodiments, the control spring 10 effective on the output member 5 exerts a force which is detractive from the force exerted by the power spring 1 on the output member 5. Hence, the motor 14 is operable to determine the residual force exerted on the output member 5.

The shaft 65 of the electric motor 14 is coupled to a shaft 106 which carries near its right-hand extremity a disc 66 the periphery of which is toothed at 67 and is engageable with a solenoid-operated latch 68. This arrangement operates in exactly the same way as the similarly-referenced parts in the embodiment of FIG. 4 to allow for the locking and un-locking of the control springs 10 exerting any particular force on the output member 5.

Means similar to those in the embodiment of FIG. 4 are provided for determining the maximum residual force to be exerted on the output member 5 in an "emergency application". These means include the collapsible stop 77 together with its clutch face 78. In this case, the clutch face 78 is engageable with the left-hand face of the disc 66. It will be seen in FIG. 5 that the shaft 106 passes through the pressure plate 100 and, whilst rotatable therein, is secured for axial movement therewith by the plate 100 being sandwiched between, on one side, a circlip 107 and, on the other side, a bearing 108 the outer race of which is pinned at 109 to the shaft 106. Thus, when the shaft 106 has moved a sufficient distance to reduce the detractive force allowed to be exerted by the control springs 10 to a desired minimum (and, therefore, the residual force exerted on the output member 5 to have reached a desired maximum) the disc 66 being rotated by the electric motor 14 operating to reduce the detractive force being exerted by the control spring 10, will be carried by the plate 100 into engagement with the clutch face 68 and will be braked thereby to prevent further rotation of the electric motor 14.

Figure 5:
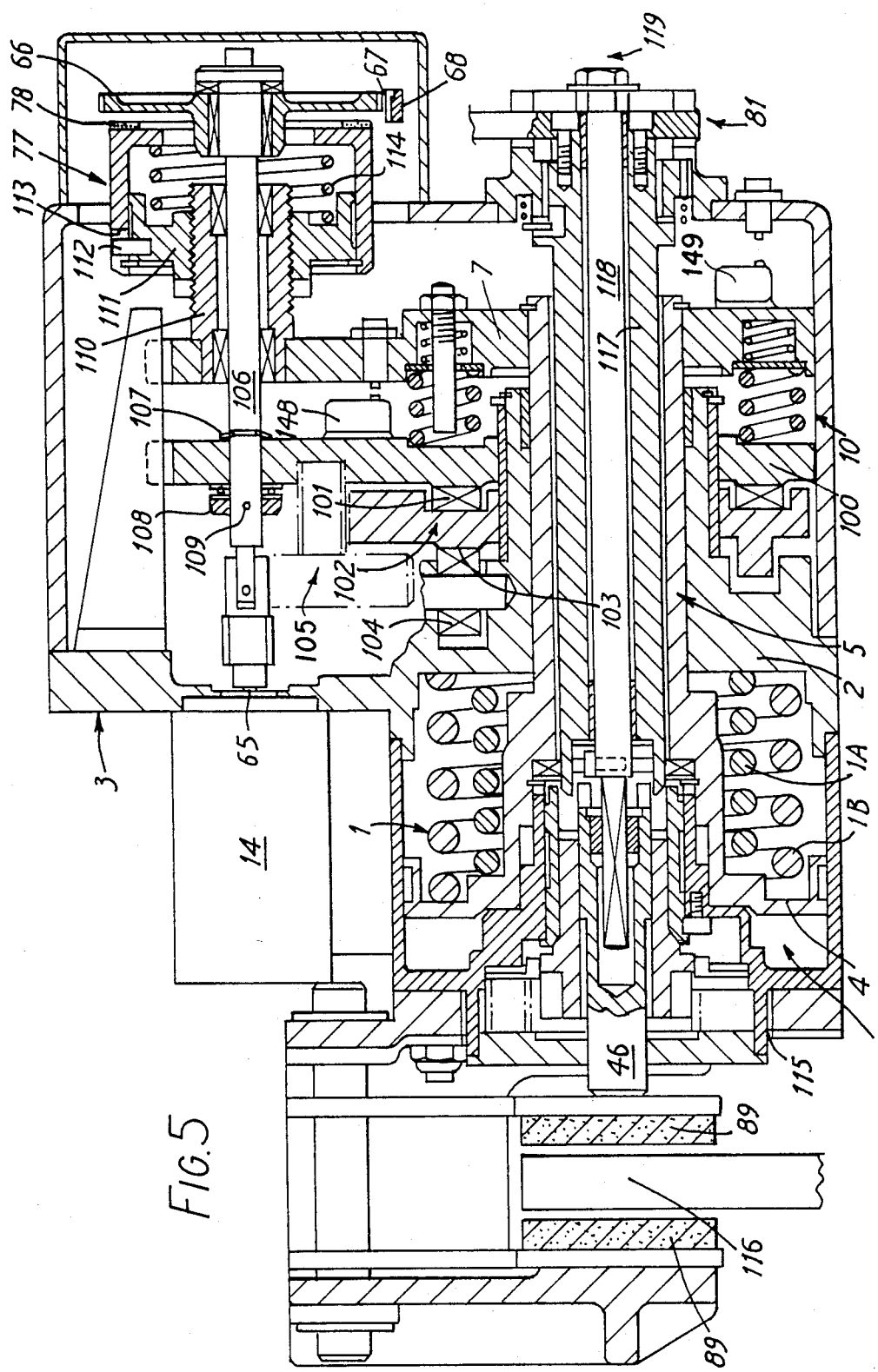
FIG. 5 is a cross-sectional view of a more sophisticated embodiment based on the concepts shown in the FIG. 4 embodiment.

It will be seen that, because again the collapsible stop 77 is carried on the output member 5 as in the embodiment of FIG. 4, the arrangement of the embodiment of FIG. 5 offers the same advantage as the comparable arrangement of FIG. 4 in ensuring that wear of the brake does not result in an unacceptable reduction of the brake force in a load-limited brake application.

In this embodiment of FIG. 5, the collapsible stop 77 also provides for variable-load adjustment of the maximum, residual force permitted to be exerted on the output member 5.

As has been observed above, in railway braking actuators it is frequently desirable to ensure that the maximum permitted braking forces are consistent with the load of the railway vehicle.

To achieve such control, the shaft 106 is rotationally supported in a threaded tube 110. The threaded tube 110 is engaged by a nut 111 carrying a pin 112 axially slidable in a slot 113 in the adjustable stop 77. Means (not shown) are provided for rotating the stop 77 together with the nut 111 to a degree dependent upon the load of the vehicle. Such rotation will cause axial movement of the nut 111 towards or away from, as the case may be, the disc 66. This movement of the nut 111 will carry with it the collapsible stop 77 under the influence of the spring 114 extending between the nut 111 and the end face of the stop 77. Thus, the spacing between the end clutch face 78 on the stop 77 and the disc 66 can be varied in accordance with the load of the vehicle. This will result in the maximum permitted rotation of the motor 14 and, therefore, the maximum residual force exertable on the output member 5 to be adjusted according to the load of the vehicle.

The micro-switches 148 and 149 of the embodiment of FIG. 4 are also provided in this embodiment.

There is provided, in this embodiment, a slack adjuster mechanism generally indicated by the reference numeral 115. This slack adjuster is of a well-known type and in so far as it forms no part of the present invention any detailed description of it is unnecessary in this Specification. This slack adjuster operates merely to ensure the maintenance of the desired clearance between the brake pads 89 and the brake disc 116. This it does by adjusting the extension of a final output member 46 by which the pads 89 are operated, relative to the output member 5 in the well-known manner. Extending from the slack adjuster 115 through the output member 5 is a tube 117 and a shaft 118 terminating at their right-hand end in manual adjustment means generally indicated by the reference numeral 119. Again, the construction and function of these parts are well-known and the only observation here needing to be made as to these parts is that they are provided to permit of manual release of the brake.

The operation of the embodiment of FIG. 5 is, in all essentials, similar to the operation of the embodiment of FIG. 4 so that no further description of its operation is here required.

We claim:

1. An electrically-controlled force-exerting actuator comprising a force-applying power spring arranged to exert a variable force on an output member, a force-applying control spring arranged with respect to the power spring such that a variable force exerted by the control spring is detracted from the force exerted by the power spring to determine the residual variable force exerted on the output member by the power spring, an electric motor operable to vary in a graduated manner the detractive force exerted by the control spring, and an adjustable stop variation of the position of which variably determines the minimum force exertable by the control spring.

2. An actuator as claimed in claim 1, wherein the power spring is operative between the output member and a fixed part of a housing of the actuator and the control spring is operative between the output member and a part the position of which is determined by operation of the electric motor.

3. An acutator as claimed in claim 2, wherein said part is threadedly engaged with a threaded member and operation of the electric motor effects relative rotation of the part and the threaded member.

4. An actuator as claimed in claim 3 wherein the stop is engageable by a part mounted for rotation with but for axial movement relative to the threaded member.

5. An actuator as claimed in claim 4, wherein the threaded member is normally restrained from rotation by a normally-energised electrically-controlled locking means effective to lock the threaded member until the locking means is de-energised.

6. An actuator as claimed in claim 1, wherein the adjustable stop is threadedly engaged with a threaded part, there being provided a second electric motor operation of which effects relative rotation of the stop and the threaded part thereby adjustably to position the adjustable stop.

7. An actuator as claimed in claim 1, wherein the adjustable stop is carried on the output member.

8. An actuator as claimed in claim 1, wherein the part the position of which is determined by operation of the electric motor is a cam rotation of which by that electric motor determines the detractive force exerted by the control spring.

9. An actuator as claimed in claim 8 wherein the stop is engageable by a part which is mounted for rotation with the cam but for axial movement relative to the cam.

10. An actuator as claimed in claim 1, wherein there is provided a final output member in addition to the output member and to which any residual output force exerted on the output member can be transmitted, and means is provided for extending the final output member relative to the output member before any residual output force exerted on the output member is transmitted to the final output member.

11. An actuator as claimed in claim 10, wherein sensing means are provided for sensing when the output member and the final output member are in their relatively extended positions and which, only when so sensed, allows operation of the electric motor.

12. An actuator as claimed in claim 10, wherein the transmission path for the residual output force between the output member and the final output member includes two relatively-rotatable and threadedly-engaged members of which one is clutchable to the output member and the other is engageable with the final output member.

13. An actuator as claimed in claim 12, wherein there is provided a spring which urges the output member and the final output member to their relatively extended positions, the spring being operative on said other of the two relatively-rotatable and threadedly-engaged members.

14. An actuator as claimed in claim 13, wherein a further electric motor may be provided by operation of which the two relatively-rotatable threadedly-engaged members can be relatively rotated relatively to move the output member and the final output member against the effect of the spring urging these two output members to their relatively extended positions, to their relatively un-extended position.

15. An actuator as claimed in claim 13 wherein the sensing means also allows operation of the further electric motor only after completion of operation of the first mentioned electric motor fully to cease exertion of the residual force on the output member.

* * * * *